United States Patent [19]

Nykerk

[11] Patent Number: 4,897,630

[45] Date of Patent: Jan. 30, 1990

[54] PROGRAMMABLE ALARM SYSTEM HAVING PROXIMITY DETECTION WITH VOCAL ALARM AND REPORTING FEATURES

[75] Inventor: Michael Nykerk, Encino, Calif.

[73] Assignee: Electronic Security Products of California, Inc., Reseda, Calif.

[21] Appl. No.: 260,933

[22] Filed: Oct. 21, 1988

Related U.S. Application Data

[63] Continuation-in-part of Ser. No. 5,873, Jan. 21, 1987, Pat. No. 4,794,368.

[51] Int. Cl.$^4$ .......................... B60R 25/10; B60Q 1/00
[52] U.S. Cl. .................................... 340/426; 340/430; 340/460; 340/429; 340/309.15; 340/692; 340/531; 340/539; 340/561; 340/565; 340/551; 379/40; 381/51
[58] Field of Search .................................... 340/63–65, 340/550–554, 565, 566, 522, 523, 505, 506, 527, 528, 541, 539, 531, 692, 426, 429, 430, 460, 309.15, 561; 180/173; 307/10 AT, 9.1, 10.1, 10.2; 379/37–44, 67; 381/51, 53, 86, 110

[56] References Cited

U.S. PATENT DOCUMENTS

4,410,884 10/1983 Heiland .............................. 340/523
4,455,551 6/1984 Lemelson .......................... 340/692
4,642,612 2/1987 Crump ................................ 340/523

OTHER PUBLICATIONS

"Auto Alarm Systems," Consumer Reports, Oct. 1986, pp. 658–662.
Kaplan, Lerner (editors), "Realism in Synthetic Speech," IEEE Spectrum, Apr. 1985, pp. 32–37.
Kaplan (editor), "Industrial Electronics," IEEE Spectrum, Jan. 1988, pp. 50–52.

Primary Examiner—Donnie L. Crosland
Attorney, Agent, or Firm—Fitch, Even, Tabin & Flannery

[57] ABSTRACT

An alarm system for detecting, signaling and reporting the occurrence of a penetration towards or an unauthorized entry into a defined area, such as towards or into a closed automobile. The alarm system includes a proximity detector to detect an intrusion into a prescribed zone or region around the defined area, and one or more sensors to sense an unauthorized entry event or attempted entry event into the defined area. The alarm system further includes means for generating vocal speech warning or alarm signals for the purpose of: (1) drawing attention to the fact that an unauthorized penetration or entry event has been sensed, and (2) providing vocal reports to indicate the status of the system and to alert the owner of the system that a prior unauthorized event was detected. During use of the system, the user of the system can select various operating modes and report options, thereby providing flexibility in how the system is used.

23 Claims, 5 Drawing Sheets

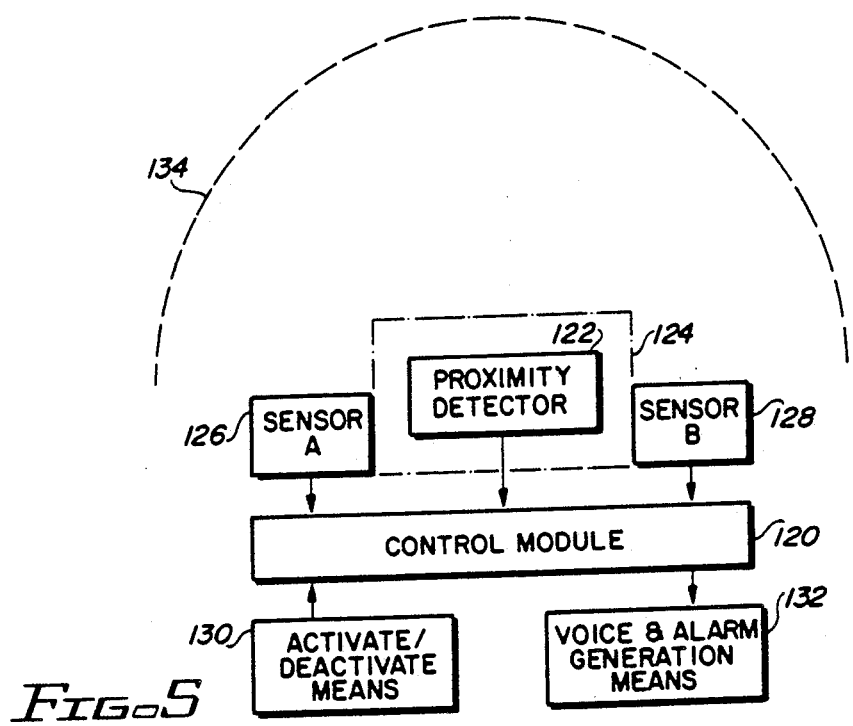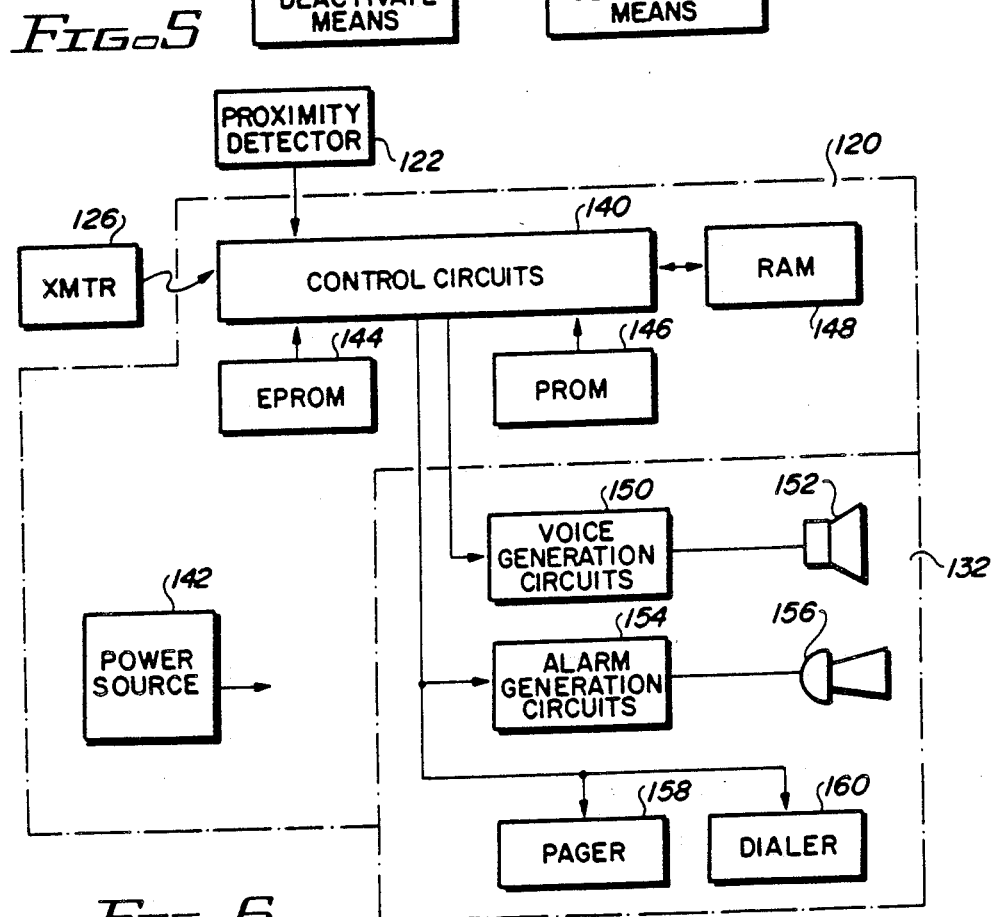

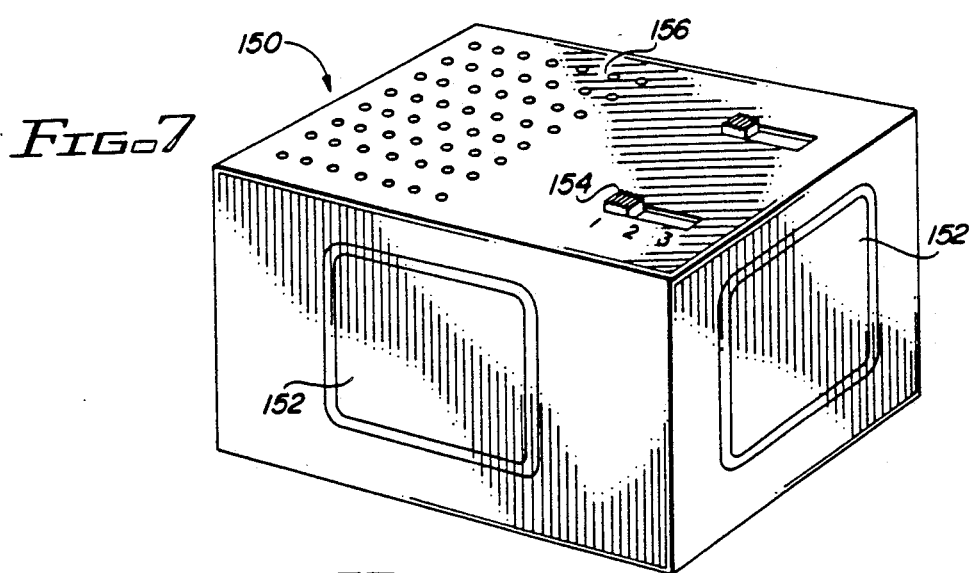
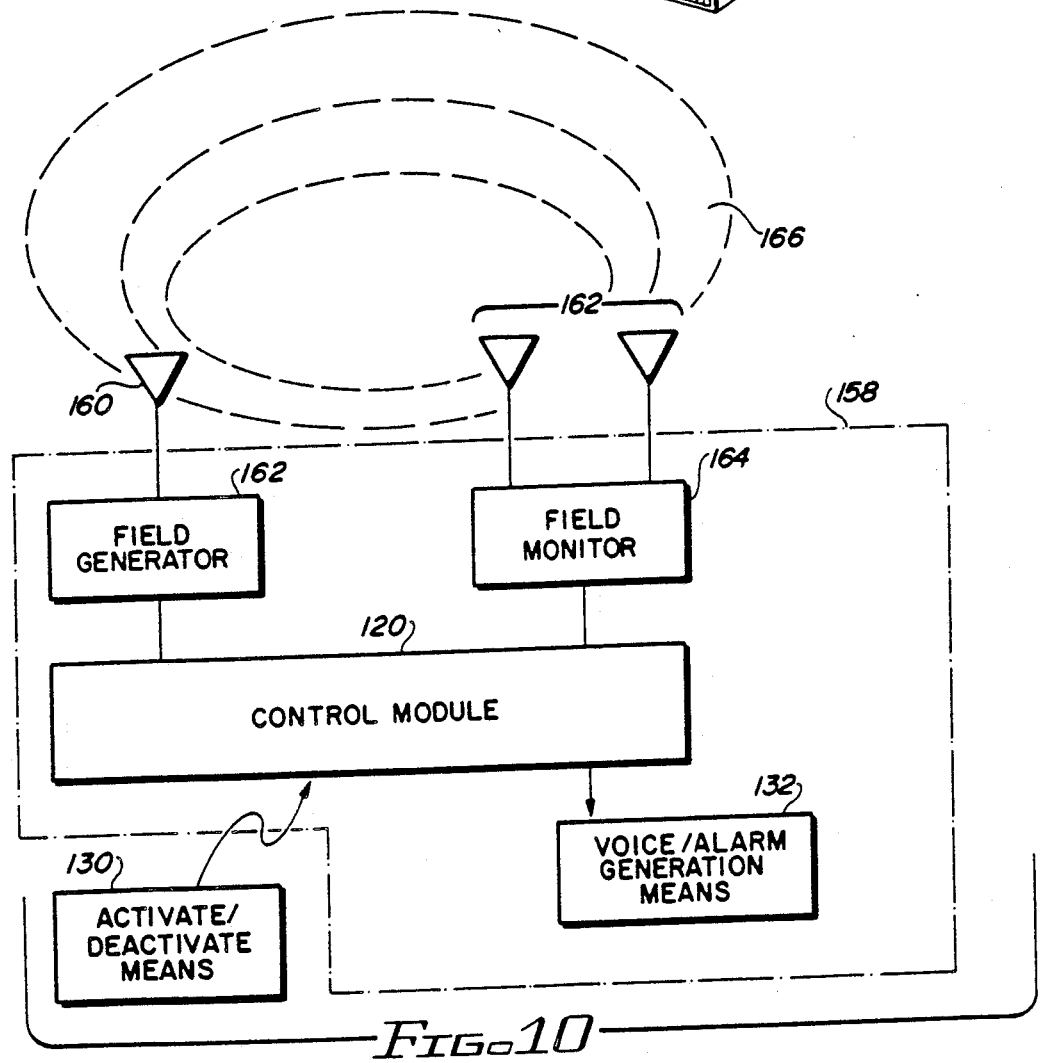

PROGRAMMABLE ALARM SYSTEM HAVING PROXIMITY DETECTION WITH VOCAL ALARM AND REPORTING FEATURES

This application is a continuation-in-part of patent application Ser. No. 07/005,873 filed Jan. 21, 1987, now issued as U.S. Pat. No. 4,794,368, which patent is incorporated herein by reference (hereafter "the '873 application").

BACKGROUND OF THE INVENTION

The present invention relates to alarm systems, and more particularly to programmable alarm systems that provide proximity detection in combination with vocal reports and alarms generated by voice synthesis techniques.

Alarm systems are known in the art. A typical alarm system is installed for the purpose of securing a defined area from unauthorized intrusion or trespass. The defined area that is secured by the alarm system will usually comprise a closed area, such as a specified room(s) within a building, or an entire building or house. In the case of automobile alarm systems, the secured area protected typically comprises the interior of the automobile, and may also extend to unauthorized tampering with the exterior of the automobile. However, no known systems extend to protecting an area or zone around the vehicle or other object to be protected; and of warning someone who intentionally or unintentionally enters this protected zone prior to sounding the alarm.

All alarm systems have certain basic elements in common. All include one or more sensors that are used to sense an entry event or other activity that could be viewed as an unauthorized tampering or presence (hereafter a "violation"). The sensor(s) are coupled, usually with electrical wires (although RF or other communication links may also be used), to a central control unit or equivalent circuit. When an entry or other activity is sensed by the sensor, an appropriate signal is sent to the control unit, which, if armed, generates an alarm signal. The alarm signal, in turn, may be used locally to sound an audible alarm, such as a loud siren or loud bell (intended to scare off the would-be intruder and to draw attention to the fact that an intrusion or other violation has been detected). The alarm signal may also be used to signal a remote location, such as a police station or a neighboring facility, of the violation that has been detected.

In the case of a simple automobile alarm system, the vehicle's existing electrical system (used, for example, to turn on a light when a door is opened) is used as a basic sensor that is connected to a control module. An alarm circuit within the control module is triggered whenever the monitored event occurs, such as when the door is opened. A siren or horn is sounded if too much time passes (typically 10 to 15 seconds) before the alarm system is turned off (disarmed).

More sophisticated automobile alarm systems supplement this basic alarm system with additional sensors (e.g., that sense the opening of the hood or trunk, the removal of an automobile cover, or the presence of "motion" within the vehicle) and a correspondingly more complex control module. Such systems may also include backup battery protection and remote paging capabilities. Further, it is not uncommon for such systems to take more preventative steps than merely sounding an alarm. For example, automobile alarm systems are known in the art that, upon sensing a violation (such as the opening of the door, trunk or hood while the system is armed), will disable the ignition and/or fuel delivery system of the automobile's engine, thereby rendering it impossible to drive the vehicle under its own power.

A feature common to all automobile alarm systems is the ability to selectively arm or disarm the system. A simple alarm system is armed after a prescribed time delay, such as 15 seconds, following the manual setting of an arming switch inside of the vehicle. (Typically, such switch is "hidden" or otherwise made non-conspicuous so that only the vehicle's owner knows of its location and function.) Once armed, all of the systems sensors are enabled and any entry or tampering event is interpreted as an unauthorized event or violation. The prescribed time delay after manually setting the arming switch allows the vehicle owner sufficient time to exit the vehicle prior to the system becoming "armed". Similarly, upon reentering the vehicle, as mentioned above, another time delay allows the owner sufficient time to manually disarm the system before the alarm is sounded.

Unfortunately, situations can and do arise where the prescribed time delay, either for exiting or reentering the vehicle, is too short. The result is that it is not uncommon for an automobile alarm system to be "falsely" triggered (meaning that an authorized exit or entry usually the owner's exit or entry—has been interpreted as an unauthorized entry). Needless to say, false triggering can not only be a nuisance and an annoyance, it can also be an embarrassment. Further, in some situations, false triggering can also create a safety hazard either to the owner or to those who might respond to the falsely triggered situation without knowledge that it is a false alarm.

Potentially more serious than false triggering, however, is the possibility of false arming (meaning that the system has not been armed when the owner thinks it has been armed). False arming arises because the owner has no positive means by which he or she can verify that the system is properly armed or disarmed. Typically, a simple indicator light may be used to indicate the armed/disarmed status of the alarm system. However, such a status light is usually only visible from inside of the vehicle. Thus, once the owner has exited the vehicle, he or she has no way of verifying that arming has actually occurred (other than by reentering the vehicle, which reentry will either sound the alarm or cause the false triggering concerns mentioned above).

In view of these false triggering and false arming concerns, what is needed is an automobile alarm system that provides positive verification to the owner of the armed/disarmed status of the system, even when the owner is outside of the vehicle. Such a system would greatly reduce the risk and consequences of both false triggering and false arming.

Another shortcoming of prior art automobile alarm systems is that the alarm, once triggered, will continue to sound until the system is manually turned off (disarmed). In the case of false triggering, as above described, this shortcoming is not too serious because the owner is right there and can turn off the system quickly. However, if the owner is not present—such as would occur if an unauthorized entry attempt has been made and the would-be intruder has fled from the scene; or, if the owner "loaned" the vehicle to a friend but forgot to tell the friend how to disarm the system; or, if there is some sort of malfunction with the sensor or the control module—such continuous sounding of the loud, attention-getting alarm can create a major nuisance and safety hazard. Accordingly, more sophisticated alarm systems known in the art sound the alarm for only a prescribed time period, e.g. one minute, and then turn the alarm off. However, when the owner returns, such systems typically have no way of notifying the owner that an unauthorized entry event or violation has occurred. While some of the more sophisticated systems will provide some visual (e.g., an indicator light) or audible (e.g., a beeping sound) indication to the owner upon his or her return that a violation has occurred, such indication does not tell the owner when the security violation occurred or, in the case of a system that employs multiple sensors, what type of security violation occurred. Such information, if available, could prove invaluable to the owner as an aid in assessing appropriate action to take and, in situations where actual damage or theft of articles occurred, in completing police and insurance reports. Unfortunately, to communicate such information to an owner using conventional output communication devices, such as printers, CRT or LCD screens, or one-line character displays, would significantly add to the cost and complexity of the alarm system.

It is apparent, therefore, that an alarm system is needed that not only notifies the owner of the occurrence of an unauthorized entry event, but that also informs the owner, without using expensive, cumbersome communication devices (such as printers and visual character displays), of the type and time of occurrence of the unauthorized entry event.

A further major concern with existing automobile alarm systems relates to their cost of manufacture and purchase, complexity of installation, and ease of maintenance verses their performance. To illustrate, a simple automobile alarm system (e.g., one that uses only the existing wiring of the automobile to sense the opening of a door and that sounds an alarm when unauthorized entry is detected) can be quite inexpensive to manufacture and simple to install (and therefore quite affordable to the owner). Unfortunately, such a simple alarm system does not suit the needs, nor provide adequate protection, for many automobile owners. Therefore, most owners who want an alarm system will choose an alarm system that provides more protection and better suits their particular needs and vehicle.

Another concern associated with automobile and other type of alarm systems is that the sensors are designed to sense only a violation event that has already occurred, which event could (and usually does) involve some type of damage to the secured object, such as the breaking of a lock or the breaking of a windshield or other window glass. Thus, while the violation event is advantageously sensed by the alarm system, and the alarm is triggered by such event (which triggering of the alarm scares away the would-be intruder and/or signals others of the violation event), the violation event disadvantageously may cause damage or harm to the object being protected that must be repaired. What is needed, therefore, is an alarm system that not only senses a violation event, but that also detects when a violation event is about to occur so that a preliminary warning signal can be given in an attempt to protect against a would-be intrusion and prevent any damage before it occurs.

Because every make and model of automobile is somewhat different, and further because every owner is also different, and further because the needs of every owner change as a function of time and situation, there is no known universal automobile alarm system that will suit the diverse needs of all owners at all times. Therefore, an owner must carefully shop around and try to select the alarm system that provides the best compromise given the owner's particular desires, needs and budget. See, e.g., "Auto Alarm Systems", *Consumer Reports*, October 1966, pp. 658-62. If the owner's needs or wants subsequently change, the only option available to the owner is to replace or upgrade the existing system with a new one that satisfies these new needs or wants. Such replacement and/or upgrading can be very bothersome and expensive, and in many situations is not practical.

Hence, what is needed, is a universal automobile alarm system that can be efficiently and inexpensively manufactured, readily customized at installation to suit the particular automobile and owner involved, and easily modified by the owner thereafter to alter its performance to suit the needs and wants of the owner at any given time.

An alarm system is also needed that can be easily adapted for use with an automobile, motorcycle, house, or any other item of personal or real property, either by itself or in combination with existing alarm systems; and that further includes means for detecting not only a violation event (unauthorized entry or touching), but also an unathorized approach.

SUMMARY OF THE INVENTION

The present invention addresses the needs identified above, as well as other needs, by providing an alarm system that combines a proximity detector with conventional sensors and a unique control unit that provides vocal alarm and reporting features. The proximity detector sets up a protected zone or region around the object being protected, such as a vehicle. When an intrusion is sensed into this area, a preliminary warning is vocally given informing the intruder that a protected region has been entered. This warning may be followed by a vocal count-down that gives the intruder ample time to move out of the protected area before the alarm is sounded. If, after the count-down has been completed (or after the expiration of a prescribed time period), an intrusion into the protected area is still sensed, the vocal alarm of the system is triggered and a violation event is recorded. The occurrence of this violation event can be immediately reported to the owner of the object being protected, or to a designated law enforcement agency, using conventional communication techniques (e.g., a beeper, cellular telephone link, RF link, or equivalent communication link) and/or stored in the memory elements of the system for later reporting to the owner.

Advantageously, as referenced above, the alarm system herein disclosed uses voice synthesis technology to generate vocal reports and alarms in order to provide the preliminary vocal warnings, and in order to communicate to the owner the status of the system, e.g., whether the system is armed or disarmed, and whether and when a particular type of violation occurred. Such voice synthesis technology allows the alarm system's control module to efficiently and effectively provide needed warnings when the zone around the protected object is violated, and to communicate to the owner without the need for using additional and expensive communication devices, such as printers and displays, as are conventionally used in the art. Advantageously, when the system is used to protect a vehicle, use of vocal communication permits the alarm system to utilize the existing components (e.g. speakers) of the vehicle's radio or tape player, thereby reducing the cost of the system. Alternatively, the control system of the alarm system may be a self-contained unit, including a speaker and power source, that can be placed by its owner near whatever object or property the owner desires to protect, such as a boat, a motorcycle, a house, or other object or area. Advantageously, the vocal warnings that are given by the system may be programmed by the owner to convey a desired "personalized" message, or pre-programmed vocal warnings may be used.

As with known alarm systems, the alarm system of the present invention comprises one or more sensors, a control module, and means for sounding an alarm should an unauthorized event be detected by the sensor(s). However, unlike known alarm systems, the alarm system of the present combines a proximity detector and a voice synthesizer with these more conventional elements in order to provide, in addition to the synthesized vocal speech warnings and reports indicated above, a degree of flexibility, programmability, and testability in its installation, use, and operation that has heretofore been unavailable.

The proximity detector used as part of the present invention may be any type of sensor that can detect an intrusion into a designated area around the object to be protected. Preferably, such proximity detector will be one or two types: an RF proximity detector; or an infrared proximity detector. The RF proximity detector includes means for generating an electromagnetic field around the object to be protected and means for sensing any disturbance to this field that is caused by a human intruder. The infrared sensor includes means for sensing human body heat that comes within a prescribed distance of the sensor. Advantageously, both types of sensors include adjustment means for setting the sensitivity so that human bodies can be distinguished from other types of bodies, such as animals (dogs, cats, and the like), and so that a desired range around the object being protected can be achieved.

The other elements of the alarm system of the present invention, including the voice synthesizer, may be as disclosed in the above referenced parent patent 4,794,368, or as known in the art.

In particular, the control module used with the alarm system herein disclosed comprises a microprocessor that is programmed to monitor the various sensors and react in a prescribed manner depending upon the particular mode of operation that has been selected. With the microprocessor, there is included an EPROM (Erasable Programmable Read Only Memory) memory circuit for storing the various programs that define the response the microprocessor takes for a given situation; a PROM (Programmable Read Only Memory) for allowing a desired personalized vocal message to be initially recorded at the time of installation or for providing pre-recorded vocal messages to be used; voice generation circuits for converting digital signals generated by the microprocessor to analog voice signals that can be amplified and played back through the internal and/or external speakers; and various interface or driver circuits for coupling the alarm signals generated by the microprocessor to appropriate alarm components, such as a pager, a siren, or other desired display or warning devices. The alarm system also includes a menu control pad (manual switch), through which the owner can manually select a desired mode of operation, from a vocal list of possible modes of operation, for the system. One of the options includes an interrogating mode wherein the system provides an oral status report of the system. Another mode allows various tests to be performed. The alarm system, in one embodiment, further includes an RF receiver through which remotely transmitted control signals for the alarm system may be received. Advantageously, the control module may be built-in to the object being protected (such as under the hood of a vehicle); or housed as a portable self-contained unit that may be situated on or near any object to be protected, such as a boat, house, bike, etc.

The RF receiver that is included as part of the alarm system of the present invention provides the owner the option of interrogating and/or setting the alarm system to a desired mode of operation from a remote location through the use of a portable transmitter. This transmitter is advantageously a very small, light-weight, hand-held device that can be carried, for example, on a key ring. The signals generated by this portable transmitter have a range equivalent to that commonly found in garage-door opener transmitters i.e., approximately 25–150 feet. In one embodiment of the invention, this same transmitter may be used as a garage door opener transmitter as well as the interrogation/set transmitter of the alarm system.

A major feature of the present invention is the ability to sense an intrusion into an area around the object being protected prior to the actual occurrence of a violation event (which violation event may result in damage to the object), thereby possibly frightening the would-be intruder away from the object and preventing damage thereto.

Another feature of the present invention is the ability to easily program into the system at installation the particular options that are desired in order to best suit the needs and wants of the owner relative to the particular object to be protected. To this end, a programming device is provided to the installer that conveniently plugs into the control module at installation. This programming device advantageously lists all of the various installation options available to the system in an easy-to-understand series of menus. The installer, through the use of a keyboard that forms part of the programming device, as well as other appropriate data input devices, can readily make the desired selections in just a matter of minutes. Once the desired options have been selected and verified, the necessary programs required to carry out the selected options are transferred to the EPROM of the control module. Further, any desired vocal messages may be spoken or keyed into the device and converted to appropriate digital signals that are stored in the PROM of the control module. (Alternatively, factory produced PROMS containing preset vocal messages may be selected for use.) The PROM device may be programmed once at installation. In contrast, the EPROM circuits of the control module are designed to accommodate a large number of reprogramming operations, although it is contemplated that most owners will not need nor want this capability. However, this feature does provide a degree of universality to the alarm system in that the control module can be readily upgraded to new performance levels, including those of a different type of object to be protected.

BRIEF DESCRIPTION OF THE DRAWINGS

The above and other advantages and features of the present invention will be more apparent from the following more particular description thereof, presented in conjunction with the following drawings and appendices, wherein:

FIG. 5 is a block diagram of a self-contained embodiment of the alarm system of the present invention;

FIG. 6 is a more detailed block diagram of the self-contained embodiment of the alarm system of FIG. 5;

FIG. 7 is a perspective view of an embodiment of the invention of FIG. 5 wherein the proximity detector is realized using an infrared sensor;

FIG. 10 is a block diagram of the RF-field generator embodiment of the invention shown in FIG. 8.

DETAILED DESCRIPTION OF THE INVENTION

Figure 1:
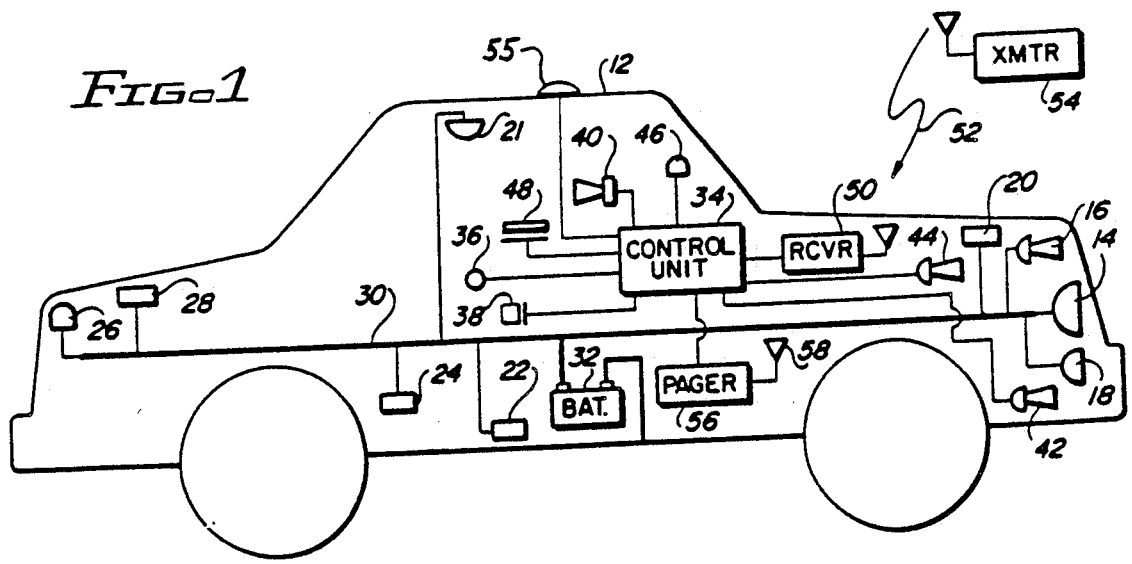
FIG. 1 is an outline of a typical passenger automobile, showing some of the key components therein that form part of the automobile alarm system embodiment of the present invention.

The following description is of the best presently contemplated mode of practicing the invention. This description is not to be taken in a limiting sense but is made merely for the purpose of describing the general principles of the invention. The scope of the invention should be ascertained with reference to the appended claims.

In describing the alarm system of the present invention, it will first be helpful to provide an overview of the alarm system and the features included therein. Basically, the alarm system includes a programmed "voice" that allows the owner to have instant access to pertinent information regarding both the alarm system and the object being protected at any time. This "voice" is communicated through either interior and/or exterior speakers that form part of the alarm system. Advantageously, when the object being protected is an automobile, the interior speakers may be the same speakers used with the vehicle's radio.

The owner/operator communicates with the alarm system through either an electronic menu pad (switch) or a portable hand-held remote transmitter. With just one press of the transmitter or menu pad, the owner is notified as to the status of the system or the object being protected. Included in this status information is maintenance information; an indication as to which alarm features are being turned on or off; which sensor(s) caused an alarm to sound; and how long ago an intrusion into the area around the object occurred, or how long ago a violation (unauthorized entry event) occurred.

With the alarm system of the present invention, not only does any unauthorized entry event activate an alarm, but any attempt to even get close to the object being protected causes a voice warning to be given. It is as though an invisible beam surrounds the object being protected and sets up an adjustable invisible field. This invisible beam is referred to as Invisibeam (Invisibeam is a trademark of Electronic Security Products of California, Inc.) When a human body penetrates this field, i.e., when a person enters the space around the object being protected while the alarm system is armed, a vocal warning is given. If the intruder does not move out of the protected field, an additional warning is issued followed by either additional verbal warnings and/or a brief audible countdown. If the intruder steps away, the countdown will stop and the system is reset. However, if the intruder remains within the field, an alarm will be triggered.

In one embodiment, the vocal warning given by the system may be a factory selected message, such as: WARNING! WARNING! YOU HAVE PENETRATED A PROTECTED AREA. AN ALARM WILL BE TRIGGERED IF YOU DO NOT LEAVE THIS AREA WITHIN FIVE SECONDS. If the intruder does not leave the protected area, this first warning is followed, after five seconds (or other selected time period), by a second message, such as: WARNING! LEAVE THE PROTECTED AREA OR THE ALARM WILL BE TRIGGERED. TEN NINE EIGHT... and so on until the count down is complete, at which time the alarm will sound if a penetration into the protected field is still sensed by the system's proximity detector. In another embodiment (available as an option), the vocal warning message(s) may be programmed by the owner at the time the alarm system is purchased, thereby allowing the owner to personalize the warning statement(s) with whatever message(s) he or she would like to give.

At the conclusion of the warning period, or when any unauthorized entry event is detected, whichever occurs first, an alarm is sounded. This alarm may also take several forms. For example, in the case of an automobile alarm system, an exterior siren and the vehicle's horn, along with one of the following voice messages are heard: "I'VE BEEN TAMPERED WITH!", "VEHICLE SECURITY VIOLATION!", or "BURGLAR-BURGLAR!"Because a voice is used to sound the alarm in this fashion, the alarm system is referred to as Vocalarm. (Vocalarm is a registered trademark of Electronic Security Products of California, Inc.)

When the alarm system herein described is used to protect an automobile, each alarm system includes sensors for protecting all doors, windows, and motion of the vehicle. In addition to the protection afforded by the Invisibeam field or proximity detector, one minute after an alarm is triggered due to an unauthorized entry event, the system is reset automatically, and is ready to sound again in the event of another break-in attempt. If the doors are left open on intrusion, the alarm continues to sound for five minutes, at one minute intervals, in order to attract more attention to the vehicle.

There are three embodiments of the alarm system herein described for use with automobiles. (Other embodiments, for use with other objects to be protected, such as boats, houses, bicycles, motorcycles, fences, etc., will be described hereafter.) In a first automobile embodiment, the proximity detector is mounted inside or on the vehicle and electrically connected, through the use of a suitable electrical cable, to the control module of the system. In a second embodiment, the proximity detector is "portable" and in RF communication with the alarm system's control module. In a third embodiment, the proximity detector operates as its own independent alarm system, using its own features for security, such as by disabling the automobile's starter, an other features to warn that an intrusion into the protected space has been sensed, such as flashing the lights, honking the horn, etc. In all of these embodiments, the owner carries a small hand-held portable transmitter to operate the alarm system. Advantageously, this transmitter may include up to four separate independent channels, each controlled with a separate control button. If these buttons are individually depressed, or if combinations of the buttons are depressed, up to sixteen separate functions can be triggered. Hence, several vehicles, a garage door opener, a home security system, and other functions can all be operated with the use of a single transmitter.

Upon exiting the vehicle, a voice report from inside the vehicle reminds the owner: "PLEASE ARM VOCALARM!" The owner then depresses the appropriate button(s) on the portable transmitter in order to perform the arming function. If, in response to arming the system, a voice report indicates: "WARNING", then the owner is notified that one of the protection sensors is not functioning properly. Further, the owner may easily test the arming of the proximity sensor by merely stepping close to the vehicle, e.g., next to a door or window, and verifying that the first warning message is given, and then simply stepping away from the vehicle before the second warning is given or before the countdown of the second warning is completed. Disarming of the system must occur before re-entry into the vehicle or the alarm will sound. Disarming of the system also turns off the proximity detector and allows the owner to approach the vehicle without triggering the preliminary warning messages. Such disarming is performed by merely depressing the appropriate button(s) on the portable transmitter. Upon opening the driver's door, a voice report is given from inside the vehicle indicating which sensor should be checked. For example, if the motion sensor is not functioning properly, the report will indicate: "CHECK MOTION!"

If, upon disarming the vehicle, a "WARNING" vocal report is heard, this notifies the owner that while he or she was away an unauthorized penetration (into the protected field) or an unauthorized entry event or violation was detected. (Optionally, the owner may select not to record all of the unauthorized penetrations that occur into the Invisibeam field. Further, the owner may optionally select not even to arm the proximity detector portion of the alarm. This option may be most useful when the vehicle must be parked in a public area where large numbers of persons will normally walk in close proximity to the vehicle.) Upon opening the driver's door, a voice report is given from inside of the vehicle as to which sensor was violated. For example, if the motion sensor caused the alarm to sound, the owner will hear: "MOTION VIOLATION!" Further, with the second embodiment, the owner will also be notified in a voice report as to the time when the violation occurred. This feature advantageously enables the owner to give accurate details of the violation in the event a police or insurance report must be made. The built-in timer within the system keeps track of violations for up to sixty days. Upon arming the system, all previous reports of violations are canceled and the system is ready to receive and log new violation entries.

The vehicle embodiment of the invention also allows the owner or operator, through use of a menu pad located inside of the vehicle, to not only select, but also hear, those features that have been turned on or off. A vocal menu list is recited by the system. Features included in this "menu" list may include: (1) reports, (2) manual arming, (3) test, (4) silent arming, (5) window sensor on-off, (6) system on-off, (7) proximity reports on-off, (8) proximity detector on-off, and (9) hood release. The owner makes a selection by pressing the menu pad during or immediately after hearing the desired feature "spoken" in the vocal menu list. Further details associated with many of these features or modes may be found in the '873 application.

A description of the hardware associated with the vehicle embodiment of the invention will now be presented in conjunction with FIGS. 1-4. This description will be followed by a more general description of a self-contained embodiment of the invention, intended for use with any object to be protected, in conjunction with FIGS. 5-9.

FIG. 1 shows an outline of a typical passenger automobile 12 and some of the key components thereof that form part of this vehicle embodiment of the invention. These components include headlights 14, a horn 16, park lights 18, a hood sensor 20 (that senses the opening of the hood), a dome or other interior light 21, front door sensors 22 (that sense the opening of the front doors), back door sensors 24 (that sense the opening of the back doors), taillights 26, and a trunk sensor 28 (that senses the opening of the trunk). All of these components are electrically connected in conventional manner to the automobile's electrical wiring harness 30, which harness interconnects these components to the automobile's electrical system, including a battery 32.

In addition to these conventional components, the alarm system of the present invention includes a control unit 34 (sometimes referred to herein as a control module) that is also connected to the wiring harness 30. Connected to this control unit 34 are additional sensors, such as a motion sensor 36 (to sense motion within the interior of the automobile), a microphone or glass sensor 38 (to sense striking or hitting of the automobile's glass windows), and a proximity sensor 55 (to sense when a human body or other large mass comes within a specified range of the vehicle). The proximity sensor 55 is shown in FIG. 1 as being connected directly to the control unit 34. However, it is to be understood, that the proximity sensor 55 could be coupled to the control unit 34 through any suitable means, such as an RF link through the receiver 50. Other sensors (not shown) could also be connected to the control unit 34 as desired. Further, the proximity sensor and associated controls may be packaged and installed as a separate alarm system that functions independent of any other alarm systems that may exist.

As shown in FIG. 1, the control unit 34 is also connected to the automobile's internal speaker(s) 40, an external siren 42, and an external speaker 44. These components, as has been discussed, provide additional flexibility in the type of alarms and status signals and reports provided by the alarm system.

The owner/operator controls and interrogates the control unit 34 through use of an interior menu control pad 40 that is directly connected to the control unit 34. Alternatively or conjunctively, another control/interrogation path is provided through RF receiver 50 (which receives control or interrogate signals 52 from an external transmitter 54). A status light 46, connected to the control unit 34, provides a visual indication to the owner/operator that the alarm system is powered on. In some embodiments, a paging unit 56 may optionally be connected to the control unit 34 to provide remote paging capabilities should a violation be detected. Such paging unit 56 transmits a prescribed signal, through antenna 58, to a remote receiver (not shown) in order to signal the alarm condition. The remote receiver is typically carried by the owner and emits a beeping sound when being paged, thereby notifying the owner that a violation has occurred. More sophisticated remote receivers may be connected to a telephone circuit and provide the capability of automatically dialing a prescribed sequence of telephone numbers in order to alert at least one remote location of the sensed alarm condition.

Figure 2:
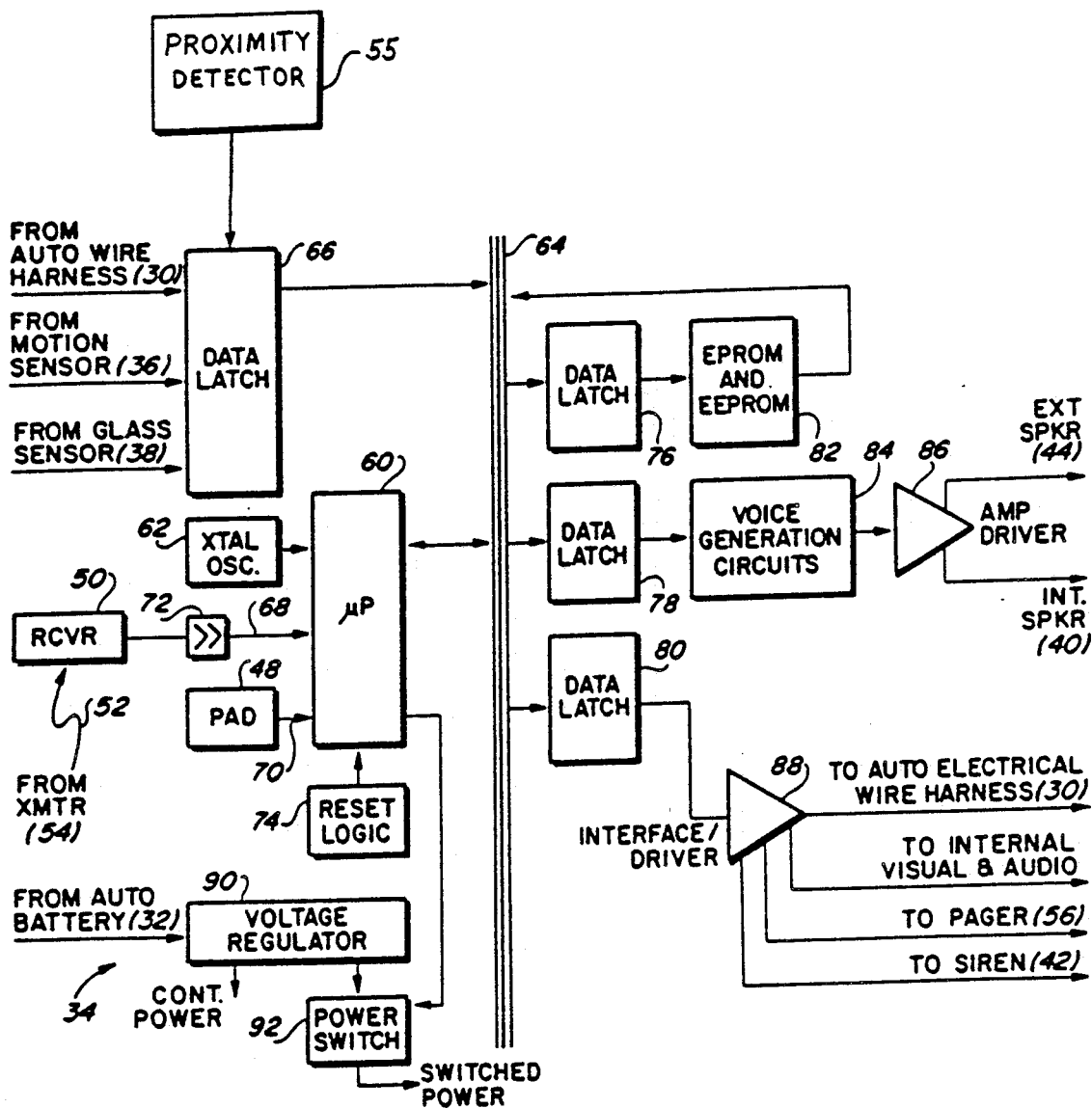
FIG. 2 is a block diagram of the control module of the automobile alarm system embodiment of FIG. 1.

Referring next to FIG. 2, a simplified block diagram of the control unit 34 is shown. Although simplified, FIG. 2 contains sufficient detail to enable one to gain an overview and basic understanding of how a microprocessor circuit functions as the control unit for the alarm system shown. Operational details associated with the circuit design and operation of the control unit 34 can be found, for those more familiar with microprocessor art, in the more detailed logic/schematic diagrams of the '873 application.

As indicated in FIG. 2, at the heart of the control unit 34 is a microprocessor circuit 60. A microprocessor circuit may be thought of as simply a digital processing circuit that receives and processes digital data according to a prescribed sequence. The processing sequence is defined by a "program", which program is stored in some appropriate memory device. The microprocessor circuit 60 of FIG. 2 is programmed to monitor the various sensors used within the alarm system and to provide a prescribed response, such as the sounding of an alarm, when an entry into the protected region around the vehicle (penetration), or an unauthorized entry event into the vehicle (violation), is detected. The microprocessor circuit 60 is further programmed to store the time and type of violation event that is detected so that such information may be subsequently provided to the owner/operator in a vocal report. Further, the time of a penetration event may also be optionally recorded and subsequently provided in a vocal report.

As shown in FIG. 2, the microprocessor circuit 60 is clocked by a master clock signal derived from a crystal oscillator circuit 62. This clock signal is used to control all the intricate data processing operations that occur within the microprocessor circuit 60 and, indeed, throughout the control module 34. Digital data is sent to and received from the microprocessor circuits over data bus 64. Sensor data received over the automobile's wire harness 30 (such as the opening of a hood, trunk, or door), or from the motion sensor 36 or the glass sensor 38 or the proximity detector 55, is latched in input data latch 66. (Latching of these sensed events is necessary because the signal from the sensor may be a signal that changes state for only a short period of time.) The latched output from input data latch 66 is coupled to the microprocessor circuit 60 via the data bus 64.

Control and interrogate signals from receiver 50 or control pad 48 are coupled directly to the microprocessor circuit 60 through signal lines 68 and 70 respectively. Signal line 68 has a connector block 72 attached thereto into which a mating connector from the output line of the receiver 50 is inserted. This same connector block 72 may advantageously be used as a connection point for a programming device, as explained below in connection with FIG. 4, during installation of the alarm system.

Further connected to the microprocessor 60 is reset logic circuitry 74. It is the purpose of this reset logic circuitry 74 to reset the microprocessor 60 to a desired operating mode in the event of a power interruption or other condition that might adversely affect the microprocessor's operation.

The data bus 64 is further connected to three output data latch circuits, 76, 78, and 80. It is the function of these latch circuits to receive the data that appears on the data bus 64 at a particular moment in time and hold this data for subsequent presentation to a desired output circuit. Output data latch 76, for example, presents its latched data to Erasable Programmable Read Only Memory (EPROM) circuit 82. EPROM 82, in turn, presents selected data stored therein back to the data bus 64 (from which point the data may be directed, through operation of the microprocessor or latch circuits, to other selected destinations within the control unit 34). It is noted that the operating programs of the microprocessor 60 are stored in EPROM 82.

Similarly, output data latch 78 presents its latched data (obtained from data bus 64) to the voice generation circuits 84. In order to allow a larger vocabulary of synthesized speech, additional memory, such as read-only memory (ROM), not shown in FIG. 2, may be used to provide data voice signals to the voice generation circuits 84. These voice generation circuits convert the digital data to analog data representative of vocal speech. The resulting speech signals are then amplified in amplifier/driver circuits 86 and directed to the appropriate internal or external speakers.

Finally, output data latch 80 presents its latched data (obtained from data bus 64) to interface/driver circuit 88. This interface/driver circuit 88, in turn, amplifies and buffers the signal as required prior to presenting it to an appropriate alarm device, such as the automobile's wire harness 30 (which, in turn, is connected to the horn and lights), the internal and/or external speakers, the external siren 42, the pager 56, or other desired alarm devices.

Also included in the block diagram of FIG. 2 is a voltage regulator 90. Voltage regulator 90 receives input power from the automobile's battery 32 and converts this unregulated power to the appropriate voltage levels needed throughout the control unit 34 in order to properly operate the various circuits used therein. Power switch 92 advantageously provides a switched power output line that is directed to most of the alarm circuits (e.g., the voice generation circuits 84, the voice amplifier/driver circuits 86, and the interface/driver circuits 88). These alarm circuits do not need to be turned on until a violation event is detected. Hence, by operation of the power switch 92, no power is presented to such circuits until needed, thereby conserving power. In contrast, continuous power is provided to the microprocessor circuit 60 and the associated sensor circuits because such circuits need to be active at all times. However, it is noted that these active circuits consume very little power, largely because the microprocessor circuit 60 and associated logic circuits are realized with low-power-consumption CMOS (complementary metal oxide semiconductor) integrated circuits, and the sensor circuits are designed to only consume power when activated.

From the above description, the basic operation of the alarm system can now be better understood and appreciated. To summarize this operation, a controlling program for the microprocessor is initially stored in EPROM 82. When the alarm system is turned on, the microprocessor circuit 60 looks to the EPROM 82 for its operating program. When the alarm system is armed, either through the control pad 48 or the receiver 50, this operating program causes the microprocessor to continuously monitor the various sensors, including the proximity sensor. An penetration entry into the region around the vehicle, as sensed by the proximity sensor, or an unauthorized entry event into the vehicle, causes the input data latch 66 to be set, which setting is sensed by the microprocessor 60. The microprocessor responds, as controlled by its operating program, by sounding a warning signal or an alarm and by storing a data signal indicating the type of penetration or unauthorized entry event that occurred and the time at which it occurred.

The type of warning or alarm that is sounded and its duration is controlled by the program and any operating options that may have been selected by the owner/operator through either the control pad 48 or receiver 50. For example, in one mode of operation, the sensing of a penetration event causes the warning messages described above to be generated. If the intruder remains within the protected field or region for the prescribed time period, or attempts an entry into the vehicle, a loud vocal alarm is sounded through the external speaker. It is the intent of this load alarm to frighten the would-be intruder away from the automobile. This alarm is generated by presenting the appropriate data on the data bus 64 and latching this data into output data latch 78. Voice generation circuits 84 then act on this data by converting it to analog signals representative of the desired vocal speech. Such a vocal warning or alarm may also be accompanied by the sounding of other alarms, such as the siren, horn, and/or the flashing of lights. These other alarm signals are generated by latching appropriate data into output data latch 80, from which point it is directed to the appropriate alarm device through interface/driver circuits 88.

In a typical operating mode, the microprocessor program continues the "alarm sounding" for only a prescribed period of time, such as 60 seconds. When the owner/operator returns and disarms the system, a vocal report is generated informing the owner/operator through the internal speakers of the type and time of unauthorized event that occurred and/or the time the penetration event occurred. Such vocal report is generated in the same manner as was the vocal alarm, i.e., the microprocessor places the appropriate data signals on the data bus 64. This data is then latched into output data latch 78, and the voice generation circuits then act on this data in order to generate the desired speech signals therefrom.

Figure 3:
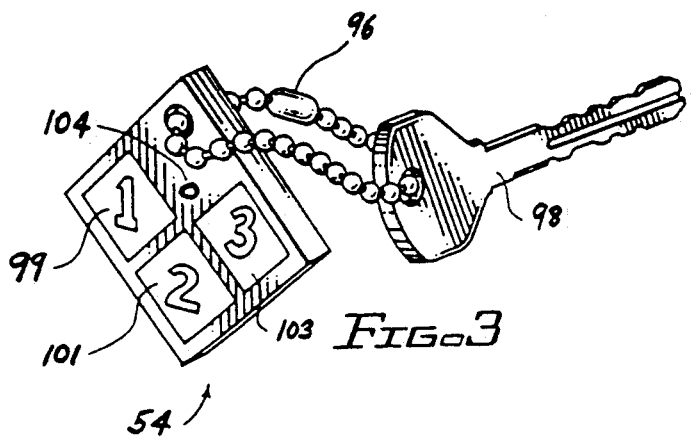
FIG. 3 is a perspective view of a one embodiment of a transmitter device that can be used to remotely interrogate and set the control module of FIG. 2.

Referring next to FIG. 3, a perspective view of a preferred embodiment of a portable transmitter 54 is shown. In accordance with this embodiment, the transmitter 54 is small enough to be carried on a key chain 96, and is not any larger than a typical automobile ignition key 98 (approximately two inches square and less than ½ inch thick). As mentioned previously in connection with FIGS. 1 and 2, it is the function of the transmitter 54 to allow the owner/operator a means of controlling or interrogating the alarm system from a location external to the automobile. Primarily, the portable transmitter 54 is used for arming and disarming the system from an external location. When the system is armed or disarmed in this manner, a vocal confirmation of such arming or disarming is provided through the external speaker 44 so that the owner/operator has positive verification that proper arming or disarming has occurred.

The portable transmitter 54 is constructed using the same technology as is commonly employed in portable garage-door-opener transmitters. As has been mentioned, means are provided within the transmitter 54 for transmitting three separate control signals. A first signal, generated by depressing the "1" button 99 on the face of the transmitter 54, is sent to and received by a receiver 50 of an alarm system as described above in connection with FIGS. 1 and 2. A second signal, generated by depressing the "2" button 101, may be sent and received by a receiver 50 of a second alarm system installed in, for example, a second vehicle. A third signal, generated by depressing the "3" button 103, may be sent and received by a conventional garage-door-opener receiver for the purpose of controlling the opening and closing of a garage door. Combinations of these three signals can also be simultaneously transmitted and received and decoded by the same or different receivers in order to provide control of up to seven separate functions from a single transmitter. Thus, the owner/operator has at his or her fingertips all of the transmitters needed to effectively set and interrogate the alarm systems of all of his or her vehicles, as well as to operate the garage door where the vehicles are stored, or to perform other functions. Advantageously, in order to simplify the design and manufacture of the system, the receiver 50 may be an RF receiver of the type commonly employed with garage door openers. Such receivers typically employ an RF carrier frequency of 308.75 MHz, although any suitable frequency could, of course, be employed.

In a preferred embodiment, the portable or remote transmitter 54 is molded with high impact ABS plastic for greater durability and longer wear. A specially designed electronic membrane pad is integrated into each transmitter which prohibits the buttons 99, 101, and 103 from being accidentally depressed. Further, an LED light 104 is incorporated into the transmitting unit and is activated (turned on) whenever one of the buttons is depressed. This LED provides the operator some visual assurance that the unit is operating properly. Also, the ABS plastic case is completely water-resistant, thereby protecting the transmitter circuits in the event the unit accidentally gets wet. Less expensive versions of the case may be employed, if desired, which can be opened and which are not water resistance.

It is understood that the above description of the portable transmitter 54 is exemplary and not limiting. As those skilled in the art will recognize, the transmitter(s) contained within the transmitting unit 54 can be readily set and used to control and operate a large variety of remote controlled devices, such as house alarm systems, lights and appliances, and the like, in addition to setting and interrogating the alarm system of the present invention. It is further noted that the alarm system described herein in conjunction with FIGS. 1–4, while being described for use with an automobile, could easily be adapted to protect a house or other building or object, as described below in conjunction with FIGS. 5–9.

Figure 4:
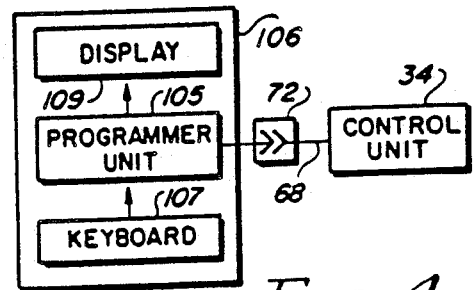
FIG. 4 is a block diagram showing the control module of FIG. 2 being programmed to a desired configuration using an installer's programming device.

As mentioned above, an important feature of the alarm system herein described is the ability to configure the alarm system at installation to suit the needs and desires of a particular owner for his or her particular automobile or other object to be protected. This is accomplished by loading into the EEPROM 82 (FIG. 2), during installation of the system, the particular option bits needed in order to provide the desired operating configuration. FIG. 4 is a block diagram that illustrates how this is done. During installation, i.e., after all of the alarm system components have been installed in the vehicle, a programming unit 105 is plugged into the connector 72. Advantageously, this connector 72 is realized using a six-conductor quick-disconnect plug of the type commonly employed in telephone jacks. Hence, it is a simple matter for the installer to disconnect the receiver 50 (FIG. 2) from the plug 72 and to connect the programmer unit 105 thereto.

The programmer unit 105 includes a keyboard 107 and a display 109. Upon turning the system on, a series of menus are displayed on the display 109 that provides to the installer a list of all of the available options and configurations that can be programmed into the system. The installer merely selects the desired item from the menu list by pushing a designated key on the keyboard 107. After all of the menus have been displayed and the desired selections have been made and verified, instructions are displayed on the screen that enable the installer to enter the desired options into the EEPROM 82 of the control unit 34. These instructions provide for simple key stroke entries that carry out the desired command.

The programmer unit 105, including the keyboard 107 and display 109, is realized using a microprocessor-based system (e.g., a portable personal computer 106) that is programmed with a program as detailed in the '873 application. In the preferred embodiment, the programmer 105 may be realized using any suitable personal computer, such as an NEC model 8210A computer, or an Olivetti model M10 computer. Preferrably, a laptop computer is used, such as a Toshiba 1200. Other computers, including other laptop computers, that could be used include a Radio Shack model 102 or any IBM PC (AT or XT) or IBM compatible personal computer, such as the Zenith laptop computer. As those skilled in the art will recognize, most personal or other computer systems currently available in the market could be programmed and used as the programmer 105. The only unique hardware requirement is the inclusion of a serial interface cable having a compatible plug for insertion into the plug 72. Of course, the system must also have the ability to serially send the desired option bits through the interface cable to the control unit 34 at a desirable baud rate (such as 4800 Baud). However, most available computer systems can be readily programmed by those skilled in the art to perform this function.

Should the owner of the alarm system desire to customize the vocal messages that are generated by the system (particularly the warning messages that are given when a penetration event is sensed), the appropriate bit patterns needed to generate the desired customized message are burned (written) into a PROM and the PROM is inserted into the control unit 34. Burning or writing a PROM with a desired set of data in this fashion is a technique that is well known in the art. Typically, however, this process must be carried out at the factory by placement of a special order. Further, a desired message from a group of possible messages may be selected by the owner at the dealer location where the owner purchases the alarm system, so long as the dealer maintains a programming computer as described previously.

Referring next to FIG. 5, a block diagram of a self-contained alarm system in accordance with the present invention is shown. The system includes a control module 120 that is coupled to a proximity detector 122. The Proximity Detector 122 is designed to be placed on or near an object 124 that is to be protected. This object 124 could be any property or structure of the owner, such as a boat, a trailer, a house, a motorcycle, a bicycle, a suitcase, etc. Additional sensors 126 and 128 can also to used in conjunction with the proximity sensor 122 to sense such events as motion or glass breakage. Activate/Deactivate Means 130, also coupled to the control module 120, provide the owner with a means for manually controlling and operating the system. As described above in connection with the automobile alarm system embodiment of the invention, such activate/-deactivate means 130 could take the form of a control pad 48 (FIGS. 1 and 2), a transmitter 54 (FIGS. 1 and 3), or any other suitable input device. Voice and alarm generation means 132 are also coupled to the control module 120. These means 132 include the appropriate digital circuits (e.g., microprocessors, memory, latches, etc.) and the appropriate analog circuits (e.g., speakers, horns, and other alarm devices) for generating the vocal warnings and alarms of the system as previously described.

It is the function of the proximity detector 122 to sense any penetration of a human body into an area or field, represented by the dotted line 134 in FIG. 5, so that a warning message can be given to inform the intruder that he or she must leave the protected area. Sensitivity adjustments are provided so that a large mass, such as a human, can be distinguished from a small mass, such as a dog or a cat. Two embodiments of this sensor are contemplated and described more particularly below. Other embodiments are also within the scope of the invention as claimed. A first embodiment utilizes one or more infrared detectors to sense body heat when such bodies are within close proximity to the sensor. A second embodiment includes an electromagnetic field generator that sets up an electromagnetic field within a region of the device. Means are included to sense any variations to this field, which variations are caused, for example, when a large body of mass enters the field. Advantageously, both embodiments of the proximity sensor include adjustment means for adjusting the sensitivity of the sensor device. This adjustment(s) allows both the range (size) of the field or area being monitored, as well as the size of the body mass that must enter the field before a detection is made, to be selectively adjusted.

Referring next to FIG. 6, a more detailed block diagram of the system shown in FIG. 5 is presented. As shown in FIG. 6, the control module 120 includes control circuits 140, power source 142, EPROM 144, PROM 146, and RAM (read-only memory) 148. The control circuits 140 include one or more microprocessors, latches, and related circuitry, as well as a receiver and other interface circuits and sensors of the type described previously in connection with FIG. 2. The EPROM 144 includes the programs used to control the microprocessor(s) of the control circuit 140. (Alternatively, conventional means could be used to load such programs in RAM 148 when the system is first turned on.) PROM 146 is used to control the voice data used in generating the various vocal messages and alarms that are used by the system. RAM 148 is used to temporarily store much of the data and commands that are used during operation of the system. It is believed that those skilled in the microprocessor art, given the descriptions of the hardware and functions presented herein and in the '873 application, can readily fashion and design an appropriate control module 120 that performs the functions described herein.

It is also seen from FIG. 6 that the voice and alarm generation means 132 include voice generation circuits 150 and at least one speaker 152. Also included are alarm generation circuits 154 and a horn and/or siren 156. Optionally included are a pager 158 and a dialer 160. All of these elements may be of the type previously described in connection with FIGS. 1–4 or in the '873 application. Advantageously, the dialer 160 may be of a type that allows it to be used with cellular telephone networks, thereby allowing the system to be fully portable.

As is known in the art, there are numerous techniques available for producing synthetic speech. As has been indicated, at the core of such speech synthesizers is a suitable memory, such as a ROM, EPROM and/or PROM that stores the programs and digitized prerecorded speech data. For the present alarm system application, where certain messages are repeated over and over (without the need for creating sentences from a stored collection of words), the process for creating the digitized prerecorded speech data is simply the reverse of generating the synthesized speech. That is, human speech is recorded, digitized, and permanently stored in the memory device, such as the PROM 146. Words are recreated by retrieving the appropriate data from the PROM under control of the microprocessor, converting it back to analog data, amplifying it as desired, and presenting it to a speaker. Hence, when an owner desires to personalize or customize a warning message that is given, all he or she need do is to record the message(s) that is desired, digitize the message, and permanently record the digitized message in a suitable PROM 146 that is inserted into the control module 120 of his or her system. Equipment for performing this operation is commercially available, and such equipment will typically be available at the alarm manufacturer's facility. PROM devices containing factory prerecorded messages may also be used in the alarm system. It is noted that many systems for generating such vocalized speech are commercially available from numerous vendors. See, e.g., "Realism in Synthetic Speech", *IEEE Spectrum*, April 1985, pp. 32–37 (Kaplan, et. al, editor).

Also known in the art are numerous sensors that could be included within the present invention to perform the function of the proximity sensor 122. Advantageously, the trend is to make such sensors smaller and smaller, and to even include such sensors on a silicon chip with other sensor-related functions. See, e.g., "Industrial Electronics", *IEEE Spectrum*, January 1988, pp. 50–52 (Kaplan, editor).

For purposes of the present invention, commercially available proximity sensors, or their equivalent, can advantageously be utilized. For example, an infrared motion sensor, such as part number 49-531 sold by Radio Shack, could be utilized to perform the function of sensor 122 in one embodiment of the invention. If such a sensor is used, it may be housed in a compact unit 150 of the type shown in FIG. 7. Advantageously, the infrared sensor can be adjusted to prevent accidental triggering by pets or other small body masses. The unit 150 includes a plurality of such infrared sensors 152 located on each side of the housing. Hence, the device is able to "look" for body heat approaching the unit from any direction. Further, manual controls, such as slide switch 154, or equivalent, allow one of more of the sensors 152 to be turned off. For example, for some applications, such as when the self-contained unit 150 is used with a motor vehicle, it may be desirous to turn off the sensor facing the engine after the engine has been operating (because there is a significant amount of residual heat associated with a recently shut off engine). For other applications, such as when the object 122 is placed against a wall (or comprises a fixed structure having only one direction of entry), it may be desirable to turn on only that sensor 152 that faces the approach direction that an intruder would have to take.

In order to conserve power, the sensors 152 (as well as most of the circuits within the control module 120) can be sampled on a low duty-cycle basis. Such sampling can include activating only one of a plurality of sensors 152 at any given time, thus creating a "scanning" of the area around the unit 150. Because the power consumption requirements of the self-contained embodiment of the invention may be too high for conventional batteries to provide over a sustained period of time, it is contemplated that the power source 142 (FIG. 5) include an AC option with battery backup. Removal of the AC power cord is readily sensed and identified as an unauthorized tamper event if the system is armed. Further, separate independent battery backup for the critical memory circuits of the unit is provided to guard against loss of critical data.

Advantageously, a speaker 156, is mounted inside of the unit 150. Alternatively, this speaker may be mounted separate from the unit 150, such as under the hood of an automobile. This speaker 156 provides the means for producing the audible voice warnings and alarms that are generated by the system. A transmitter 156 (FIG. 6) may be used by the owner to control the system in the same or similar manner as previously described in connection with the automobile alarm system of FIG. 3.

Figure 8:
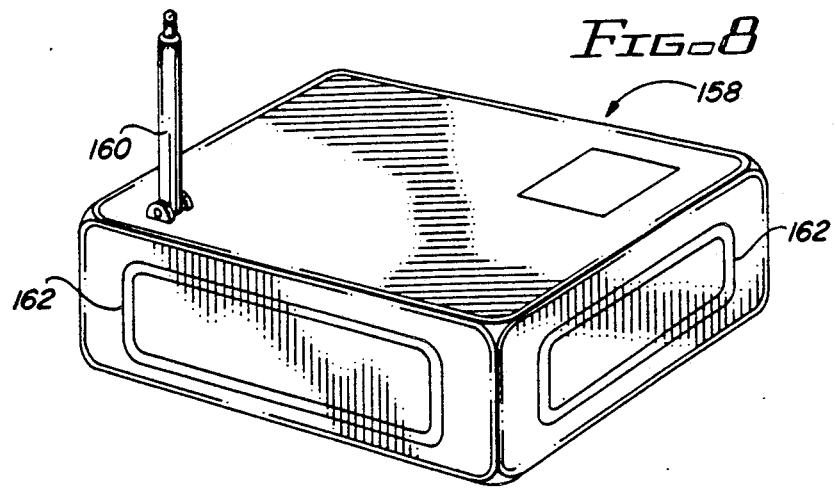
FIG. 8 is a perspective view of yet another embodiment of the invention of FIG. 5 wherein the proximity detector is realized using an RF field generator and means for detecting an intrusion into such field by the movement of a large mass, such as a human body.

Referring next to FIG. 8, a different embodiment of the self-contained alarm system of the present invention is shown. The embodiment shown in FIG. 8 includes a small housing 158 having a radiating antenna 160, or equivalent, protruding therefrom. One of more receiving antennas 162 are located on each side of the housing 158. (These receiving antennas 162 are shown in FIG. 8 as being visible on the outside of the housing 158. However, this is done for clarity of explanation only. In practice, the antennas 162 are embedded within the walls of the housing 158 or placed inside of the housing 158.) The antenna 160 shown in FIG. 8 is of the external telescoping variety, but any form of antenna, or array of two or more antennas or radiators, including antennas or radiators internal to the housing 158, could be utilized.

Referring to FIG. 10, it is seen that the unit 158 includes a field generating circuit 162 and a field monitoring circuit 164. The field generating circuit 162 sets up an electromagnetic field 166 that is radiated out from the antenna 160. The field monitoring circuit 164 monitors the status of the field through receiving antennas 162. More particularly, the field monitoring circuit 164 is delicately tuned to monitor the energy associated with electromagnetic signals radiated out from the antenna 160 that are received through the antenna(s) 162. Should any object enter the field, such as a large body mass, that was not present in the field when the device was initialized, the amount of energy received by the monitoring circuit 164 will be significantly changed. This change can properly be interpreted as the presence of a large body mass in the field. (This process is similar to that which occurs when an AM radio is tuned to a relatively weak station and the strength of the received signal is dramatically altered by someone walking in the room.) Advantageously, the power and frequency associated with the field generator 162, and the tuning of the field monitor 164, can all be selectively adjusted in order to vary the size of the field 166 and in order to sense large body masses entering the field 166 but not small body masses (such as pets or other small animals).

The frequency of the field generated by the field generator 162 is preferably in the 500–1200 KHz range and is adjustable so that optimum operation of the system can be generated. (Other versions of the field generator 162 may be designed to operate in the 6 Hz range.) The field monitor 164 is turned to the frequency, or close t.-o the frequency, of the generated signal. The received signal, after amplification and filtering, is monitored for changes in energy level. A simple rectification and filtering of the signal provides an adequate relative measure of the received energy level.

Other types of proximity detectors, known or yet to be discovered, could be utilized for purposes of the present invention. All that matters is that the detector, of whatever type, be suitable for detecting the presence of a large human mass in an area near the sensor. For this purpose, other forms of optical detectors could be used in addition to the infrared detector already described. Further, other forms of RF detectors could be used, using frequencies or signals that are not normally considered as being in the RF range. For example, a capacitive detector that uses very low frequencies could be used; or a microwave detector that uses very high frequencies could also be used. Further, any scanning type of system, using video or equivalent equipment, that monitors the area for movement, could be used through a system that digitizes are stores an image and compares it to a previously stored image. Such a system would not require a large amount of memory because only two images would have to be stored at any given time: the current image and the most prior image. These two images could then be compared pixel-by-pixel, using conventional digital techniques, in order to determine if any differences exist therebetweeen. If so, such differences are interpreted as intrusion of an object into the protected area.

Figure 9:
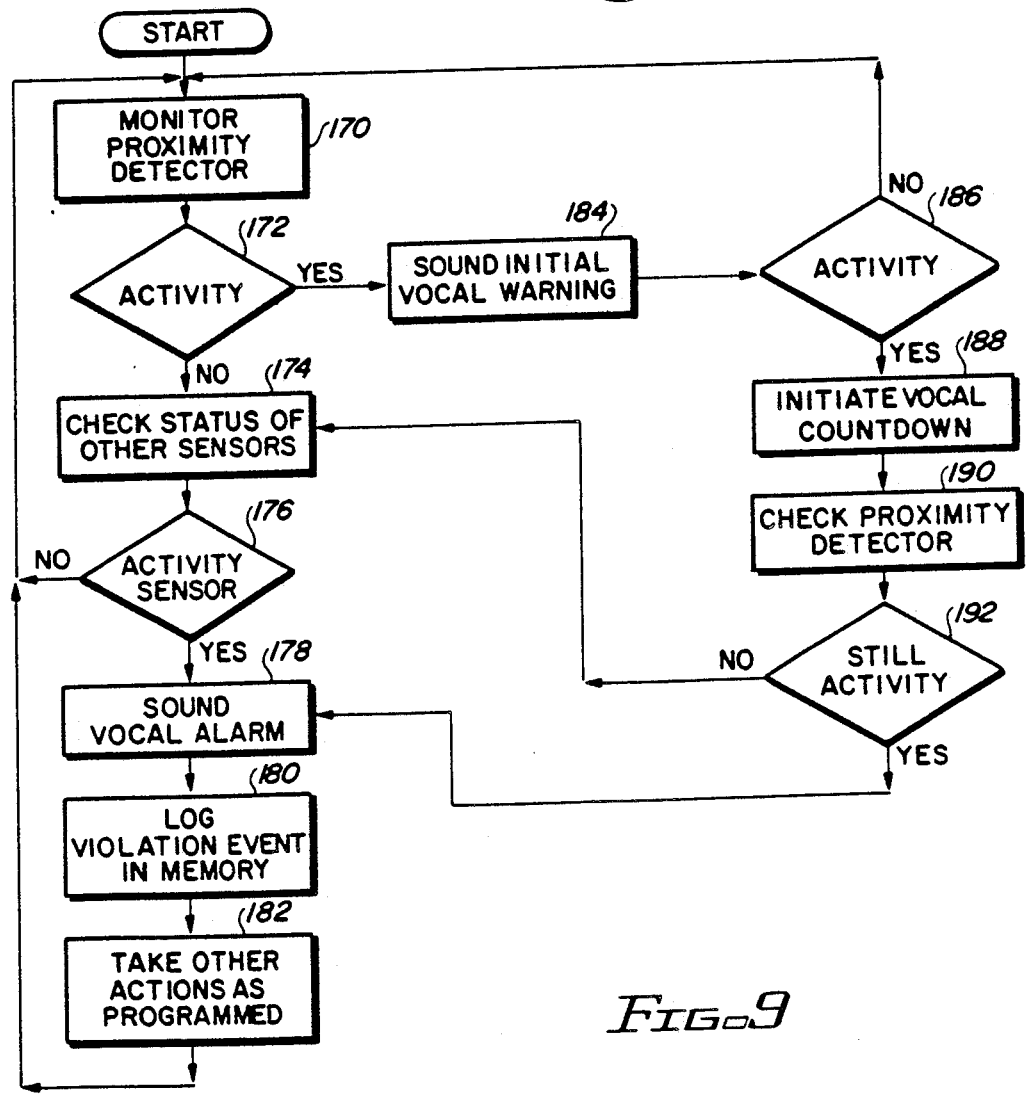
FIG. 9 is a simplified flow chart illustrating the manner of operation of the alarm system of FIG. 5.

Referring next to FIG. 9, a flow chart of the self-contained alarm system of the present invention is depicted, and will be used to explain the basic operation of the system. This flow chart represents the basic functions that are carried out by the programs within the EPROM or other memory device of the control module 120. Basically, once started, the main function of the system is to monitor the proximity detector (Block 170). This monitoring can occur on either a continual basis or a sampled basis. A sampled basis is preferred. If no activity is sensed (block 172) —that is, if the proximity detector does not indicate the presence of any person within the region or zone around the device—then the status of other sensors, if any, is checked (block 174). Such other sensors, such as Sensor A and Sensor B of FIG. 5, 126 and 128, may optionally be used to sense tilting, movement, or other physical contact with the device. If no other sensor activity is sensed (block 176), then that indicates no penetration or other violation has been detected, and the system control reverts back to monitoring the proximity detector (block 170). If, however, sensor activity is detected (block 176), then a vocal alarm is sounded (block 178) and the occurrence of the violation event is logged into the event memory of the device (block 180). Other actions may then be taken (pager, dialer, sirens, etc.) as has been programmed (block 182). Control of the system then reverts back, after the programmed period of time for sounding the alarms, to monitoring the proximity detector (block 170).

If activity is sensed by the proximity detector (block 172)—a person has been detected within the protected field or zone—then an initial vocal warning is given (block 184). It is the purpose of this initial warning to notify the intruder that he or she has entered into a protected area and needs to get out. If the intruder does leave the protected area (that area monitored by the proximity detector) and if no further activity is sensed (block 186), then program control reverts to monitoring of the proximity detector (block 170). If, however, the intruder does not leave the protected area, and if activity is still sensed (block 186) then a vocal countdown is initiated (block 188) or additional verbal messages are given. During the vocal countdown or other vocal message the proximity detector continues to be monitored (block 190). If activity is not sensed (block 192), that means the intruder has left the protected field, and program control reverts to check the status of the other sensors (block 174). If activity is still sensed (block 192), that means the intruder has not left the protected field, and an alarm condition is triggered (block 178).

It is submitted that those skilled in the programming art could readily write a program that performs the functions and steps described in connection with FIG. 9 and elsewhere herein.

While the invention described herein has been described with reference to a particular embodiment and application thereof, numerous variations and modifications could be made thereto by those skilled in the art without departing from the spirit and scope of the invention as claimed. Accordingly, the true scope of the invention should be determined with reference to the claims set forth below.

What is claimed is:

1. An alarm system for signaling an unauthorized entry into a defined area, said alary system comprising:
   proximity sensor means for sensing the proximity of an intruder within a preselected distance of said defined area, and for generating a penetration condition signal in response thereto;
   sensor means for sensing the occurrence of at least one of a plurality of unauthorized entry events and for generating a violation condition signal for each unauthorized entry event occurrence that is sensed;
   a control unit for controlling the response of said alarm system to the penetration and violation condition signals, said control unit including:
   processing means for generating a first alarm signal responsive to said penetration condition signal and a second alarm signal responsive to said violation condition signal, alarm means for sounding a first synthesized vocal alarm in response to said first alarm signal and a second synthesized vocal alarm in response to said second alarm signal, and report means for generating, subsequent to the generating of said penetration or violation condition signals, an electronically synthesized vocal speech report, said reporting including an indication of the penetration of any intruders within said preselected distance of said predefined area and the occurrence of any unauthorized entry events and the time of occurrence of each unauthorized entry event.

2. The alarm system of claim 1 wherein said processing means generates said second alarm signal only for a prescribed time period subsequent to the occurrence of said violation condition signal, whereby the alarm sounded by said alarm means only continues for said prescribed time period, the occurrence of said violation condition signal being reported at a subsequent time by said report means.

3. The alarm system of claim 1 further including interrogation/set means for interrogating said alarm system in order to determine the alarm system's current operating status and for manually setting selected operating parameters associated with its use, said interrogation/set means being electronically coupled with the processing means of said control unit, the current operating status being reported by speech through said report means.

4. A vocal alarm system comprising:
a housing having a control module therein, said control module including processing means for controlling the operation of said system, said processing means including means for generating a first vocal warning upon the initial detection of a body mass within the prescribed distance from said proximity detector, and means for generating a second vocal warning in the event the body mass is sensed as still remaining within the prescribed distance from said proximity detector at the conclusion of a prescribed time period subsequent to the generation of said first vocal warning;

a proximity detector coupled to said control module, said proximity detector having means for detecting the presence of a body mass within a prescribed distance of said detector;

at least one sensor electronically coupled to said control module and physically coupled to said housing, said at least one sensor having means for sensing an unauthorized entry event associated with said housing; and alarm means for generating a vocal warning in response to a detection by said proximity detector of a body mass that has moved within the prescribed distance of said proximity detector, and for generating a vocal alarm in response to a detection by said sensor of an unauthorized entry event.

5. The vocal alarm system of claim 4 wherein said second vocal warning including an audible vocal countdown.

6. The vocal alarm system of claim 4 wherein said processing means includes means for initiating said vocal alarm in the event a second prescribed period of time elapses subsequent to the generation of said first vocal warning.

7. The vocal alarm of claim 4 wherein said processing means further includes vocal report generating means for selectively generating a vocal report of the event sensed by said at least one sensor.

8. The vocal alarm system of claim 7 wherein said vocal report generating means further selectively reports on the events sensed by said proximity detector.

9. The vocal alarm system of claim 4 wherein said proximity detector comprises infrared means for sensing the body heat of a body mass within the prescribed distance of said detector.

10. The vocal alarm system of claim 4 wherein said proximity detector comprises:
means for generating an electromagnetic field within said prescribed distance of said detector; and
means for monitoring the presence of a body mass within said electromagnetic field.

11. The vocal alarm system of claim 4 wherein said proximity detector includes means for adjusting the prescribed distance from said detector within which the presence of said body mass is detected.

12. The vocal alarm system of claim 4 wherein said proximity detector includes means for adjusting the sensitivity of said detector to the amount of body mass present within said prescribed distance from said detector.

13. A method of operating an alarm system, said alarm system including a proximity detector for detecting the presence of a body mass within a prescribed distance thereof, and a tamper sensor for sensing the occurrence of an unauthorized tamper event associated therewith, said method comprising the steps of:
(a) monitoring the proximity detector to determine if a body mass has entered within said prescribed distance;
(b) issuing a first vocal warning in the event that the monitoring of step (a) indicates that a body mass has entered within the prescribed distance;
(c) monitoring the tamper sensor to determine if an unauthorized tamper event has occurred;
(d) triggering an audible alarm in the event that the monitoring of step (c) indicates that an unauthorized tamper event has occurred; and
(e) triggering said audible alarm in the event that the proximity sensor indicates that the body mass remains within the prescribed distance at the conclusion of a prescribed time period subsequent to the issuance of the vocal warning of step (b) regardless of whether the tamper sensor indicates a tamper event has occurred.

14. The method of operating an alarm system of claim 13 further including the step of issuing a second vocal warning after the issuance of the first vocal warning but prior to the triggering of said audible alarm.

15. The method of operating an alarm system of claim 14 wherein said step of issuing a second vocal warning includes starting a vocal countdown.

16. The method of operating an alarm system of claim 15 wherein said steps of triggering an audible alarm include generating a vocal alarm using electronic synthesized speech.

17. The method of operating an alarm system, said alarm system including a proximity detector for detecting the presence of a body mass within a prescribed distance thereof, said method comprising the steps of:
(a) monitoring the proximity detector to determine if a body mass has entered within said prescribed distance;

(b) issuing a first vocal warning in the event that the monitoring of step (a) indicates that a body mass has entered within the prescribed distance;

(c) issuing a second vocal warning in the event that the monitoring of step (a) indicates that the body mass remains within the prescribed distance at the conclusion of a prescribed time period subsequent to the issuance of the vocal warning of step (b); and (d) triggering an audible alarm in the event that the monitoring of step (a) indicates that the body mass remains within the prescribed distance at the conclusion of a second prescribed time period subsequent to the issuance of the vocal warning of step (c).

18. The method of operating an alarm system as set forth in claim 10 wherein said second vocal warning includes a vocal countdown.

19. The method of operating an alarm system as set forth in claim 18 wherein said second prescribed time period comprises the time required for said countdown to be completed.

20. An improved alarm system, said alarm system including a proximity detector for detecting the presence of a body mass within a prescribed distance thereof, and synthetic speech means for issuing a vocal alarm, the improvement comprising:

(a) means for monitoring the proximity detector to determine if a body mass has entered within said prescribed distance;

(b) means for issuing a first vocal warning with said synthetic speech means in the event that the monitoring means determines that a body mass has entered within the prescribed distance; and (c) means for triggering an audible alarm with said synthetic speech means in the event that the monitoring means determines that the body mass remains within the prescribed distance at the conclusion of a prescribed time period subsequent to the issuance of the first vocal warning.

21. The improved alarm system as set forth in claim 20 further including means for issuing a second vocal warning with said synthetic speech means prior to triggering said audible alarm in the event that the monitoring means determines that the body mass remains within the prescribed distance at the conclusion of a first prescribed time period subsequent to the issuance of the first vocal warning; said audible alarm being triggered at the conclusion of a second prescribed time period subsequent to the issuance of the second vocal warning.

22. The improved alarm system as set forth in claim 21 wherein said second vocal warning includes synthetically generated speech that counts down from a prescribed number.

23. The improved alarm system as set forth in claim 20 wherein said first vocal warning comprises synthetically generated speech that warns of a sensed intrusion into a protected area of said body mass, said protected area comprising that area within the prescribed distance of the proximity detector, said synthetically generated speech further requesting that the body mass leave the protected area.

* * * * *